US012628981B2

(12) United States Patent (10) Patent No.: US 12,628,981 B2
Daly et al. (45) Date of Patent: May 19, 2026

(54) REAL-TIME AUTOMATED COOKING CYCLES SYSTEM USING COMPUTER VISION AND DEEP LEARNING

(71) Applicant: WHIRLPOOL CORPORATION, Benton Harbor, MI (US)

(72) Inventors: Michael B. Daly, Watervliet, MI (US); Blake W. Ehrenbeck, Evanston, IL (US); Mohammad Haghighat, San Jose, CA (US); Seth Herndon, Osceola, IN (US); Bhargav M. Jain, Pune (IN); Jason Y. Lee, Hoffman Estates, IL (US); Saqib N. Shamsi, Dehradun (IN); Sunil S. Shastri, New Panvel (IN); Bruce M. Wiatrak, Bolingbrook, IL (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 105 days.

(21) Appl. No.: 17/376,599

(22) Filed: Jul. 15, 2021

(65) Prior Publication Data

US 2023/0018647 A1 Jan. 19, 2023

(51) Int. Cl.
*A47J 36/32* (2006.01)
*A21B 1/40* (2006.01)
(Continued)

(52) U.S. Cl.
CPC ................. *A47J 36/32* (2013.01); *A21B 1/40* (2013.01); *A23L 5/15* (2016.08); *F24C 7/085* (2013.01); *G05B 13/027* (2013.01); *G06F 18/24* (2023.01); *G06V 10/40* (2022.01);

*G06V 20/68* (2022.01); *A23V 2002/00* (2013.01); *A47J 2202/00* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,681,496 A | 10/1997 | Brownlow et al. | |
| 2017/0074522 A1* | 3/2017 | Cheng | F24C 7/085 |

(Continued)

FOREIGN PATENT DOCUMENTS

| | | | | |
|---|---|---|---|---|
| CN | 111096341 A | * | 5/2020 | G06F 18/241 |
| CN | 111248716 A | * | 6/2020 | A47J 27/00 |

(Continued)

OTHER PUBLICATIONS

DE 102019107834 A1 (Sillmen, Ulrich) Jul. 16, 2020 [retrieved on Jan. 27, 2024]. Retrieved from Foreign Image and Text database, translation by Clarivate Analytics. (Year: 2020).*

(Continued)

*Primary Examiner* — John J Norton
(74) *Attorney, Agent, or Firm* — BROOKS KUSHMAN P.C.

(57) ABSTRACT

A food class of a food item is recognized. A target doneness score is defined for the food item based on the food class and a desired doneness level. A recurrent model is utilized to determine a current doneness score of the food item according to sensor data captured of the food item. The current doneness score and the target doneness score are utilized to control a heating system to cook the food item.

25 Claims, 6 Drawing Sheets

(51) Int. Cl.

| | |
|---|---|
| *A23L 5/10* | (2016.01) |
| *F24C 7/08* | (2006.01) |
| *G05B 13/02* | (2006.01) |
| *G06F 18/24* | (2023.01) |
| *G06V 10/40* | (2022.01) |
| *G06V 20/68* | (2022.01) |
| *G06N 20/00* | (2019.01) |

(56) References Cited

U.S. PATENT DOCUMENTS

| | | | |
|---|---|---|---|
| 2018/0338354 A1* | 11/2018 | Bassill | A47J 27/004 |
| 2019/0110638 A1 | 4/2019 | Li et al. | |
| 2019/0242584 A1* | 8/2019 | Ebert | F24C 7/085 |
| 2019/0274337 A1 | 9/2019 | Wang et al. | |
| 2019/0285283 A1* | 9/2019 | Ebrom | F24C 15/322 |
| 2020/0217512 A1 | 7/2020 | Clayton et al. | |
| 2020/0236743 A1* | 7/2020 | Yang | G03B 21/10 |
| 2020/0278117 A1 | 9/2020 | Bhogal | |
| 2020/0367692 A1 | 11/2020 | Stipe et al. | |
| 2021/0080114 A1 | 3/2021 | Liu et al. | |

| | | | |
|---|---|---|---|
| 2021/0161329 A1* | 6/2021 | Kim | G03B 19/00 |
| 2022/0167473 A1* | 5/2022 | Kuchler | H05B 6/6458 |
| 2022/0357043 A1* | 11/2022 | Schiffler | H05B 1/0263 |

FOREIGN PATENT DOCUMENTS

| | | | |
|---|---|---|---|
| CN | 111651982 A | 9/2020 | |
| DE | 102014106541 A1 * | 11/2015 | F24C 7/085 |
| DE | 102019107834 A1 * | 7/2020 | |
| DE | 102019107819 A1 | 10/2020 | |
| EP | 3758439 A1 | 12/2020 | |

OTHER PUBLICATIONS

DE 102014106541 A1 (Maas, Bruno) Nov. 12, 2015 [retrieved on Jan. 27, 2024]. Retrieved from Foreign Image and Text database, translation by Clarivate Analytics. (Year: 2015).*

CN 111248716 A (Song, De-Chao et al.) Jun. 9, 2020 [retrieved on Nov. 14, 2024]. Retrieved from Foreign Image and Text database, translation by Clarivate Analytics. (Year: 2020).*

\* cited by examiner

REAL-TIME AUTOMATED COOKING CYCLES SYSTEM USING COMPUTER VISION AND DEEP LEARNING

TECHNICAL FIELD

Disclosed herein are approaches to real-time automated cooking cycles using computer vision and deep learning.

BACKGROUND

Cooking appliances may include predefined cooking modes, such as bake, roast, pizza, cookie, toast, popcorn, and bagel. These modes may be designed to allow a user to cook food items without setting multiple cooking parameters. For instance, a popcorn mode of a microwave oven may be defined to perform a predefined cycle of cooking at a specific wattage for a predefined period of time. Because food items vary in size, shape, and initial temperature, predefined cooking modes may not always provide optimal results.

SUMMARY

In one or more illustrative examples, a method for controlling a heating process is provided. A food class of a food item is recognized. A target doneness score is defined for the food item based on the food class and a desired doneness level. A recurrent model is utilized to determine a current doneness score of the food item according to sensor data captured of the food item. The current doneness score and the target doneness score are utilized to control a heating system to cook the food item.

In one or more illustrative examples, a smart oven for controlling a heating process is provided. The smart oven includes one or more sensors; a heating system; and a processor. The processor is programmed to recognize a food class of a food item, define a target doneness score for the food item based on the food class and a desired doneness level, utilize a recurrent model to determine a current doneness score of the food item according to sensor data captured of the food item, and utilize the current doneness score and the target doneness score to control a heating system to cook the food item.

In one or more illustrative examples, a non-transitory computer readable medium includes instructions for controlling a heating process that, when executed by a processor of a smart oven, cause the smart oven to perform operations including to recognize a food class of a food item; define a target doneness score for the food item based on the food class and a desired doneness level; utilize a recurrent model to determine a current doneness score of the food item according to sensor data captured of the food item; and utilize the current doneness score and the target doneness score to control a heating system to cook the food item.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Cooking meals is a part of daily life for many people. People generally prioritize taste, nutrition, cost, and ease of preparation when planning their meals. Yet, these attributes are often in conflict. Real-time automated cooking cycles make cooking meals easier, so users of cooking appliances can place more emphasis on taste and nutrition. Such cycles let users offload a significant part of the work, the actual cooking process, to the appliance. This allows the users to invest time in the more active steps of meal preparation, such as measuring and combining ingredients. Instead of the user monitoring the cooking appliance while the food cooks, a computer vision system may monitor the food on the user's behalf, allowing the user to reclaim that time for other activities.

A smart oven may offer assisted cycles for different food types. These cycles may be pre-programmed with certain modes, temperatures, and times designated for each food type. These modes may also be adjustable according to user inputs for quantity and preference (e.g., light/dark toast, rare/medium steak). Responsive to a user selecting a cycle and options, in some systems the oven's timer settings and other procedures may be predetermined before the cooking cycle begins. This inflexibility may reduce the effectiveness of the assisted cycles. In such systems, the user may be able to customize the cycle for the number of bread slices and the desired brownness, but cannot for example, specify the dimensions of the slices or the initial temperature, which affect how the food item may cook. Therefore, the assisted cycles may be unable to account for whether the bread was taken from the fridge or the room-temperature countertop, for instance.

A machine-learning assisted smart cycle for an oven may utilize a cavity-mounted camera and/or other sensors to observe the food as it cooks. The camera images may be analyzed by a recurrent unit, which has been trained to output a doneness score for different food classes. The programmed cooking cycle for each food class may be performed with respect to the doneness score determined by the model, rather than using a predefined time period. The cooking cycle may be completed responsive to the food achieving a threshold-level doneness score as selected by the user.

Figure 1:
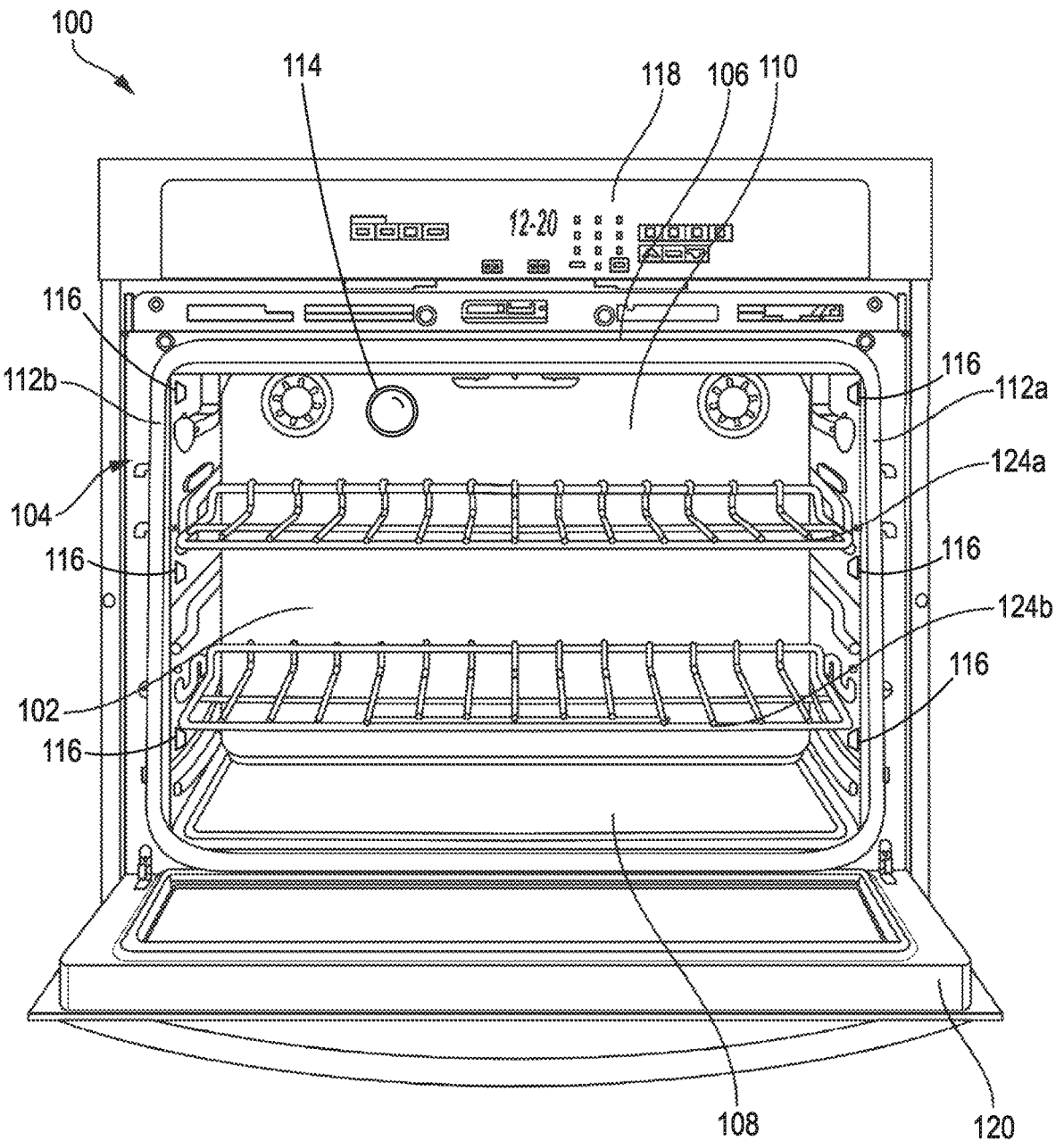
FIG. 1 illustrates an example front perspective view of an oven configured to perform real-time automated cooking cycles.

FIG. 1 illustrates an example front perspective view of a smart oven 100 configured to perform real-time automated cooking cycles. The smart oven 100 may be one of various cooking appliances, such as a conventional oven, a convection oven, a conduction oven, a microwave oven, a toaster oven. In some examples, the smart oven 100 may be a function-specific oven, such as a roaster oven, a pizza oven, etc. The smart oven 100 may be standalone in some cases, while in other cases the oven may be built-in or a component of a combination oven and stove top.

The smart oven 100 may form a cabinet 104 and define a cavity 102 having a cavity top 106, cavity bottom 108, cavity back 110, and side walls 112. A door assembly 120 may be hinged at a front of the cavity bottom 108 to permit access to the cavity 102. The door assembly 120 may include a window and a handle and may hermetically seal the cavity when the door is in a closed position. It should be noted that this is an example, and smart ovens 100 with different types of doors may be used. For instance, a door may be hinged at a side instead of the bottom. A door sensor may be arranged on the door or the cavity 102 to detect an open and closed position of the door of the door assembly 120.

The cavity 102 may be configured to receive food items for cooking, baking, and/or broiling during a cooking cycle. A camera 114 may be arranged within the cavity 102 and be configured to capture images of the contents of the cavity 102. The cavity 102 may also include temperature sensors 116 for determining the air temperature within the cavity 102 during cooking. The smart oven 100 may further include a user interface 118 configured to receive user input with respect to cycles or other oven operation. The user interface 118 may also provide information to the user such as cook time, temperature, etc.

The smart oven 100 may include a heating system 122 for heating the cavity 102 during cooking. The heating system 122 may include one or more heating elements, such as a gas heating element or an electric heating element. In one example, the heating system 122 may include a first heating element at the bottom of the cavity 102, and a second heating element at the top of the cavity 102. In yet a further example, heating elements may be arranged between the cabinet 104 and the cavity back 110 and/or the cavity top 106.

The smart oven 100 may include one or more racks 124 within the cavity 102 for supporting the food items during cooking. As shown by way of example in FIG. 1, the oven may include a top rack 124a and a bottom rack 124b (collectively referred to herein as racks 124). It should be noted that while two racks 124 are shown, smart ovens 100 with more or fewer racks 124 are possible. Regardless of quantity, the racks 124 may rest on side rails 132 arranged along the side walls 112. The side rails 132 may extend parallel or generally parallel with the cavity top 106 and cavity bottom 108 along the side walls 112 at spaced intervals. The side rails 132 may extend up the height of the side walls 112 to allow for varying positions of the racks 124 within the cavity 102. For each side rail 132 arranged on the first side wall 112a, a corresponding side rail 132 is arranged on the opposite second side wall 112b (generally at the same relative height) so that the rack 124 may be evenly maintained on each side thereof.

Figure 2:
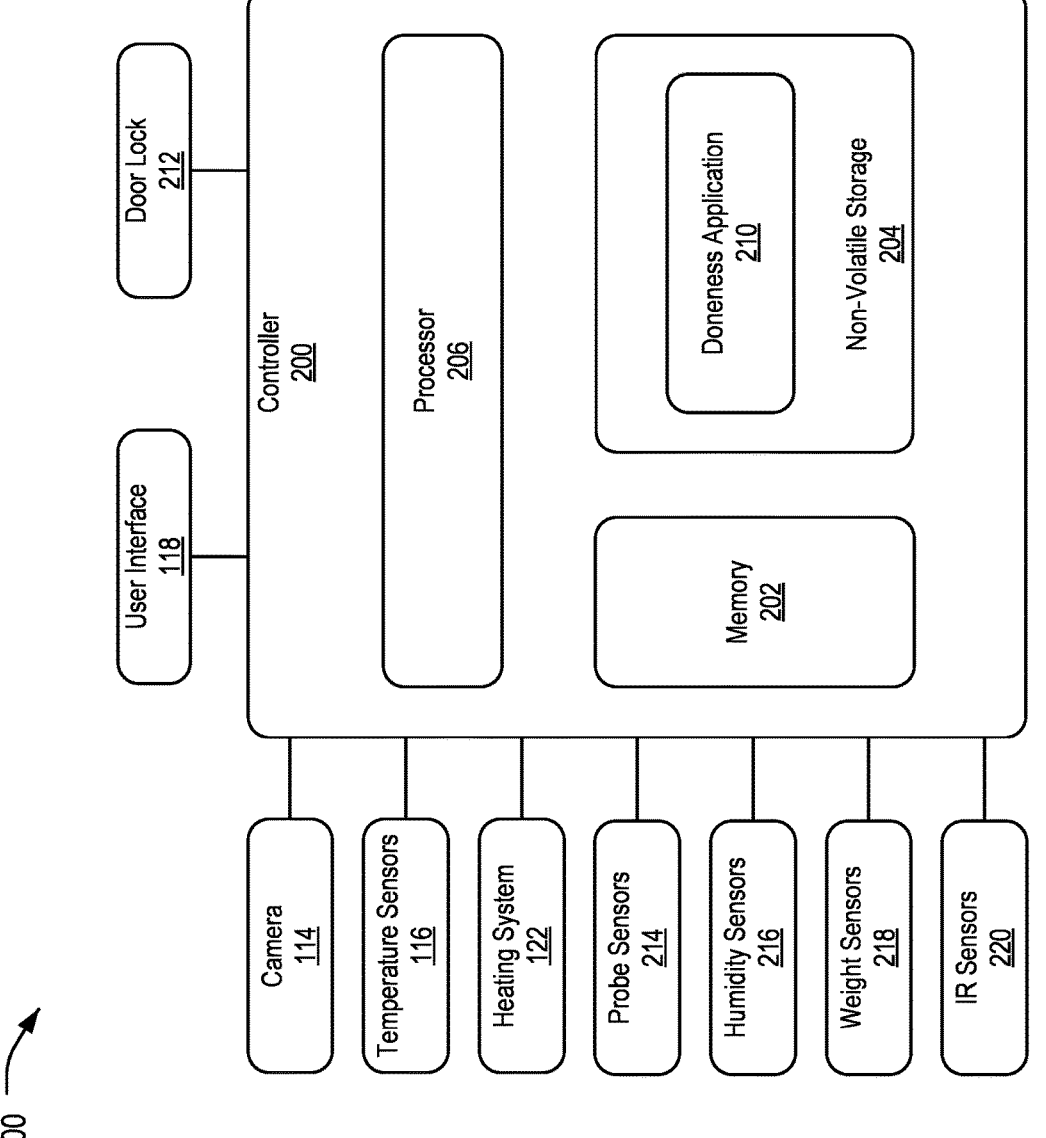
FIG. 2 illustrates an example controller configured to operate the components of the smart oven to perform real-time automated cooking cycles.

FIG. 2 illustrates an example controller 200 configured to operate the components of the smart oven 100 to perform real-time automated cooking cycles. The controller 200 may include a memory 202, a non-volatile storage 204, and a processor 206. The non-volatile storage 204 may store operations for a doneness application 210.

The memory 202 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 204 may include one or more persistent data storage devices such as a hard drive, optical drive, tape drive, non-volatile solid-state device, cloud storage or any other device capable of persistently storing information.

The processor 206 may include one or more microprocessors, micro-controllers, digital signal processors, micro-computers, central processing units (CPU), graphical processing units (GPU), tensor processing units (TPU), field programmable gate arrays, programmable logic devices, state machines, logic circuits, analog circuits, digital circuits, or any other devices that manipulate signals (analog or digital) based on computer-executable instructions residing in memory 202.

The processor 206 may be configured to read into memory 202 and execute computer-executable instructions residing in the non-volatile storage 204, such as those of the doneness application 210. Upon execution by the processor 206, the computer-executable instructions may cause the smart oven 100 to implement one or more of the algorithms and/or methodologies disclosed herein.

The controller 200 may be electrically connected to signaling interfaces of other components of the smart oven 100, thereby allowing the processor 206 of the controller 200 to manipulate the functions of the smart oven 100. For example, the controller 200 may be configured to receive user input from the user interface 118, such as requests to initiate a cooking cycle. The controller 200 may also be configured to control operation of the heating system 122, including to apply power to heating elements of the heating system 122 to warm the cavity 102, as well as to discontinue applying power to the heating element of the heating system 122. The controller 200 may also control a door lock 212 to selectively control the latch mechanism of the door assembly 120 to prevent the door assembly 120 from being opened during the cycle.

The controller 200 may also be configured to receive input from other sensors to support the operation of the doneness application 210. This may include input from sensors such as the temperature sensors 116. This may also include input from one or more additional sensors such as meat probe sensors 214, humidity sensors 216, weight sensors 218, and infrared (IR) sensors 220.

The meat probe sensors 214 may provide additional information describing the food's progress that is not visible in the images captured by the camera 114. The meat probe sensors 214 may measure internal temperature of the food and may transmit that data either as a voltage signal or an interpreted temperature. This time-varied input helps identify cooking progress that may not be obviously visible. For example, a pre-seared steak may have a blackened exterior that an independent, camera-only input model may identify as done. However, a low or changing internal temperature provides additional context of the food's actual doneness.

The humidity sensors 216 may be configured to provide data that may be used to determine the change of moisture content within the food as the cooking cycle progresses. In an example, the measure of humidity may be an amount of moisture contained within the food. In another example, the measure of humidity may be an amount of moisture identified within the cooking cavity during the cooking process.

In the images provided from the camera 114, it may be seen that a food will change size and shape overtime throughout the cooking process. The humidity sensors 216 may provide further context into the size and shape changes happening throughout the cooking process by relating them to a change in moisture. This change in moisture may allow for a more precise decision on the exact level of doneness through the cooking process.

The weight sensors 218 may include load cells or pressure sensors integrated into the racks 124 to provide information about the weight of items in the smart oven 100. A change in this weight over time may inform visual changes from the images provided by camera 114. For example, a shrinking burger loses water weight as it cooks, and when that rate of loss slows, more browning is expected. The change between initial and final/current weight may also inform the cooking process, as heavier items may use more time to cook completely then smaller items.

Figure 3:
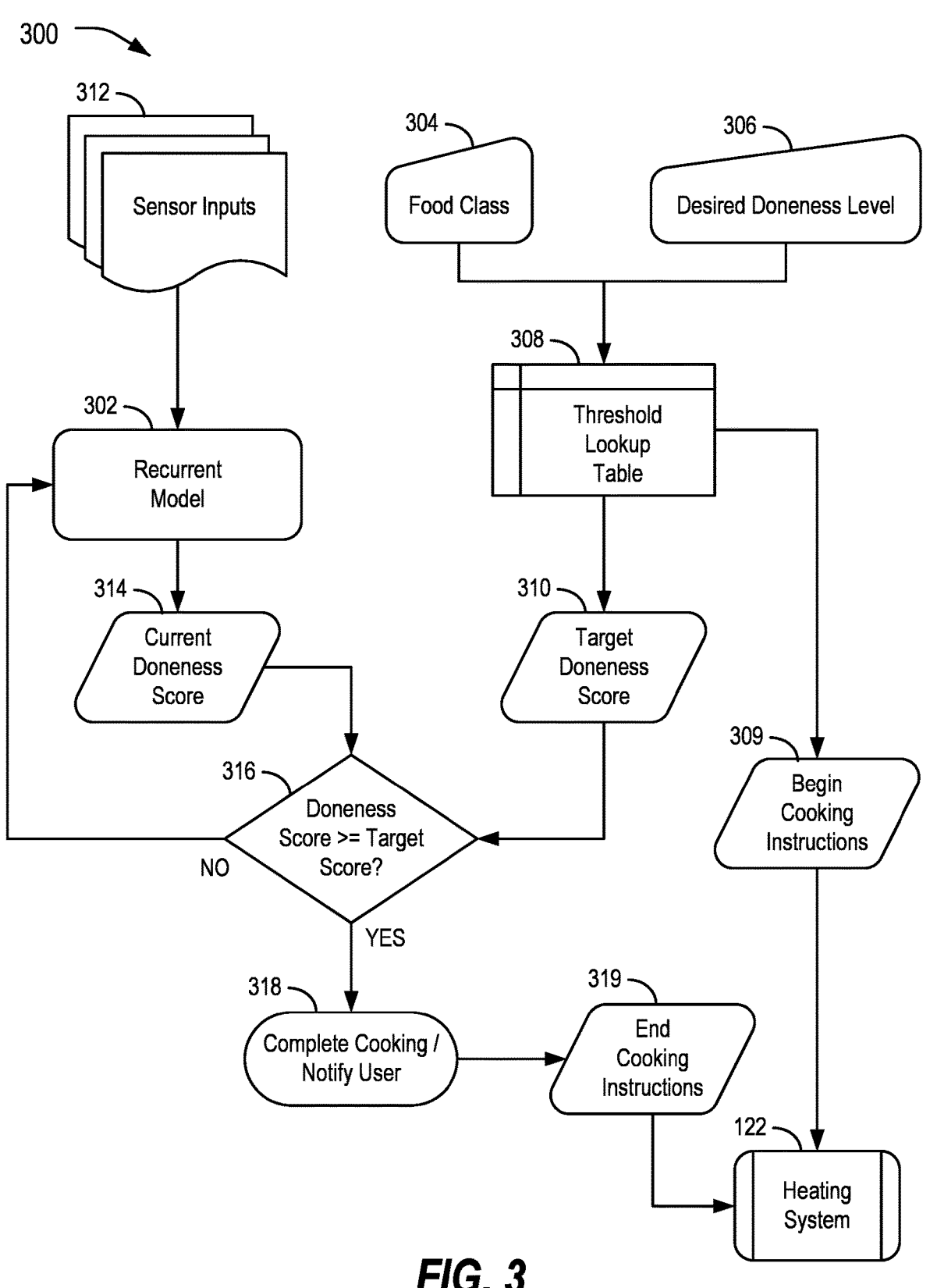
FIG. 3 illustrates an example automated cooking process including use of a recurrent model.

FIG. 3 illustrates an example automated cooking process 300 including use of a recurrent model 302. In an example, the process 300 may be performed by the doneness application 210 implementing the recurrent model 302 as executed by the processor 206 of the controller 200 of the smart oven 100. Further aspects of the architecture of the recurrent model 302 are discussed below with respect to FIG. 4.

The process 300 may begin with receipt by the doneness application 210 of input from a user. This input may include, for example, input indicative of a food class 304. In an example, the food class 304 may be indicated by confirming a suggested cycle presented by a recognition algorithm. The recognition algorithm may be an image recognition model trained using an image dataset to be able to recognize various food items. In one example, the image recognition model may be trained using the Food-101 dataset (which is a data set of 101 food categories of manually reviewed text images), but other training data sets may be used as well. In another example, the food class 304 may be indicated by user selection of a specific food class or type. The user may also specify a desired doneness level 306, e.g., through the user interface of the smart oven 100. In other examples, the desired doneness level 306 may be retrieved from user preferences.

The doneness application 210 may receive these inputs of the food class 304 and desired doneness level 306, and may utilize a lookup table 308 maintained in the memory 202 of the controller 200 of the smart oven 100 to retrieve appliance control unit (ACU) begin cooking instructions 309 and a target doneness score 310 corresponding to the combination of food class 304 and desired doneness level 306. In an example, the target doneness score 310 may be a value scaled from 0 to 1. The begin cooking instructions 309 may include temperature, convection, and/or other settings to control the heating system 122 of the smart oven 100. The lookup table 308 for the target doneness score 310 may be determined empirically by a series of lab experiments with the recurrent model 302 training. This process is determined by cooking a series of foods and logging the images with doneness scores as predicted by the recurrent model 302. After a series of images and scores has been obtained, an individual with food science experience may select specific threshold values to match corresponding doneness levels.

For example, a food scientist may capture a series of five videos of sliced bread cooking where the recurrent model 302 outputs the predictions for each frame captured by the recurrent model 302. The food scientist may review the frames of the video for each of those videos and determine an external food color desired for each desired level of doneness. For instance, for an example food item the doneness levels may include light, medium-light, medium, medium-dark, dark, and burnt. The food scientist may also determine a matching doneness threshold that matches closest to the desired food color for each of the doneness levels. The final result may be stored in the look-up table 308 for sliced bread with the following values: 0.45 for light, 0.56 for medium-light, 0.67 for medium, 0.77 for medium-dark, 0.88 for dark, and 0.98 for burnt.

During the cooking cycle, sensor inputs 312 continuously feed the recurrent model 302 with information about the state of the food being cooked. Further aspects of the receipt of the sensor inputs 312 are discussed below with respect to FIG. 5. The model 302 outputs a doneness score 314 with the same scale as the target doneness score 310 (e.g., also from 0 to 1), which is compared to the target doneness score 310. If the current doneness score 314 is less than the target doneness score 310, the cooking cycle continues. As determined at operation 316, if the scores are equal or the current doneness score 314 exceeds the target doneness score 310, the user is notified through the user interface or some other method (e.g. mobile notification) as shown at operation 318. At this point, the smart oven 100 may send end cooking instructions 319 to the heating system 122 to automatically turn off or switch to a "Keep Warm" mode, depending on the user's settings. The user can opt to continue cooking, start a new batch, or acknowledge that the cycle is complete.

If the user accepts the food when the current doneness score 314 matches the target doneness score 310, no change is made to the target doneness score 310. However, if the user directs the appliance to continue cooking the food, the recurrent model 302 may continue to generate a current doneness score 314 until the user completes the cycle. When complete, the smart oven 100 may revise the target doneness score 310 in its lookup table 308 for that food type and doneness setting. Adjacent target doneness scores 310 may also be revised for the different levels of the same food type. Similarly, if the user ends the cooking cycle prior to the current doneness score 314 reaching its target doneness score 310, the smart oven 100 may revise the target score in memory 202. These adjustments may be made automatically, or only when confirmed by the user through a prompt (e.g. "Is this closer to your preference for "medium-well" steak?)

Figure 4:
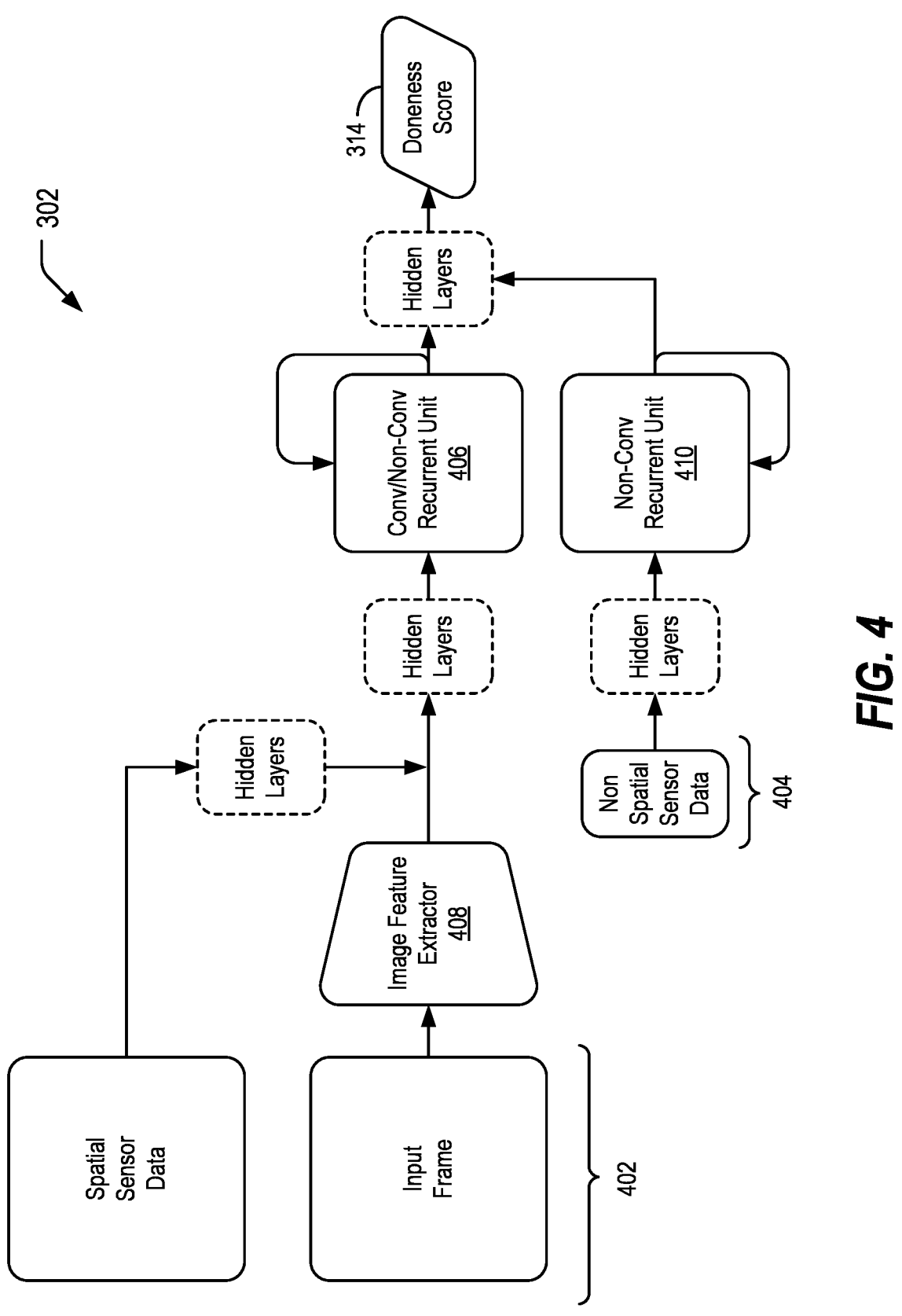
FIG. 4 illustrates aspects of the architecture of the recurrent model.

FIG. 4 illustrates aspects of the architecture of the recurrent model 302. The recurrent model 302 architecture may receive image data 402. Moreover, the recurrent model 302 may also have support for auxiliary inputs that are not an image in the cooking frame sequence. These inputs may be used to produce the current doneness score 314.

Temporal auxiliary inputs for the recurrent model 302 may be broken into two groups: (i) spatial inputs 402, and (ii) non-spatial inputs 404. The spatial inputs 402 may refer to inputs where information has an associated coordinate. For instance, the spatial inputs 402 may include input frames of a sequence of images of food captured over time. In an example, for training the input frames may be prerecorded or otherwise previously captured data of food items, whether in a smart oven 100 or not. As a possibility, during training of the doneness model 302, the input frames may be sequentially sampled frames from cooking videos. The frames may be sampled at a frequency of 0.1 Hz. For each video, the sampled frames may be batched together and used as the input frames to the recurrent model 302.

An example of an auxiliary spatial input 402 may be infrared (IR) sensor data from the IR sensors 220. For instance, the IR sensors 220 may provide a 2D map of IR reflection off the food's surface. This reading can be translated into surface temperature. A map of temperature readings over the surface of the food may provide context to the recurrent model 302 for the doneness determination, as the IR data may similarly exhibit spatiotemporal behavior as done by the input frames. In an example, this context may be used as a separate channel layered over the input frames fed into the recurrent model 302. In another example, this context may be input to the recurrent model 302 as a separate feature in an auxiliary branch. As shown in FIG. 4, the spatial information may be tiled over the output of an image feature extractor 408 and may serve as an additional channel of information for processing by the recurrent unit 406.

The non-spatial inputs 404 may refer to inputs without information tied to a specific point in space. Examples of non-spatial auxiliary inputs 404 may include oven cavity temperature from the temperature sensors 116, meat probe temperature from the probe sensors 214, data from the moisture sensors 216, data from the weight sensors 218, etc.

The spatial inputs 402 may be fed through a recurrent unit 406 configured for learning of spatio-temporal relationships. The recurrent unit 406 may be used to perform spatiotemporal relationship capturing and convolutional input/recurrent transformations. In an example, the recurrent unit 406 may be a convolutional gated recurrent network. As some other examples, the recurrent unit 406 may be a non-convolutional GRU, a non-convolutional (long-short term memory) LSTM unit, a convolutional LSTM, or another type of recurrent unit that utilizes time-distributed layers.

The non-spatial inputs 404 may be fed to a non-convolutional recurrent unit 410. The non-convolution and convolution recurrent unit outputs are merged in the network before a final doneness score 314 is outputted. The outputs of the convolutional recurrent unit and the non-convolutional recurrent unit may be combined using one or more hidden layers that output the current doneness score. It should be noted that in other examples, as with the spatial inputs 402, it is valid to tile non-spatial inputs 404 over the image feature extractor 408 output and feed a tensor with concatenated channels to the convolutional recurrent unit 410.

Figure 5:
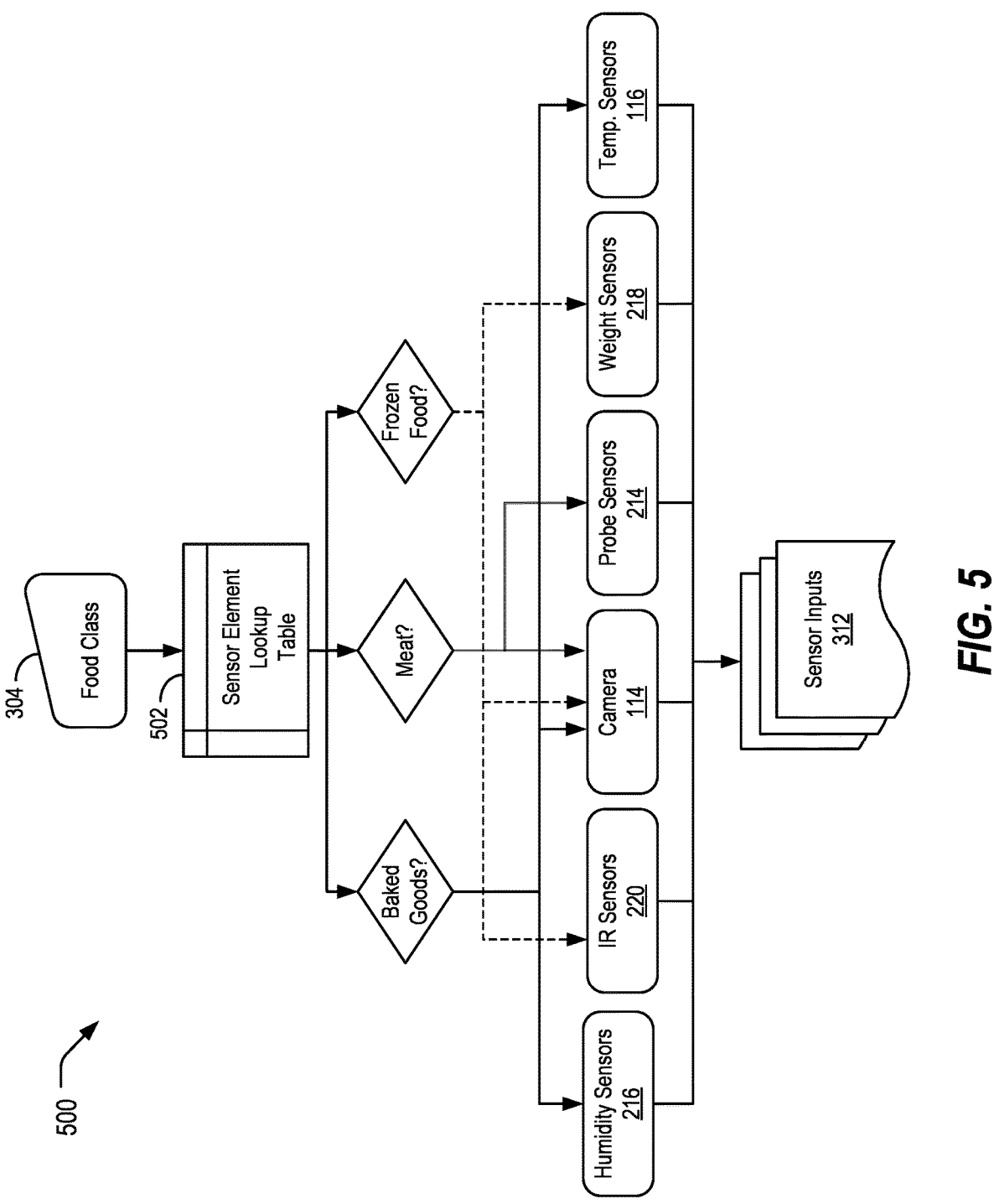
FIG. 5 illustrates aspects of the receipt of the sensor inputs for use by the recurrent model.

FIG. 5 illustrates aspects of the receipt of the sensor inputs 312 for use by the recurrent model 302. For the recurrent model 302, specific sensor inputs may be more applicable to some types of food than to other types of food that the user is cooking. This may be due to the nature of cooking for each of the types of foods. For some types of cooking, it may be more appropriate to monitor certain groupings of sensors over other groupings of sensors. It should be noted that for most, if not all, types of cooking, it is generally useful to use the camera 114 and cavity temperature sensors 116 along with other additional sensors. However, it is also possible to reach a desired doneness level 310 without the camera 114 and cavity temperature 116.

For example, when cooking baked goods such as cake or cookies in a baked goods food class 304, it may be most helpful to have the humidity sensor 216 along with other sensors to determine the final doneness level 310 of the food. This may be because the final moisture content within the food at the end of cooking can determine whether the final state of the food is acceptably cooked or not. In each of the states of a dried-out cookie or moist cookie, the food is indeed cooked fully. However, the less moist cookie may be interpreted by the user as being over done while the moist cookie may be interpreted as being perfectly cooked.

In another example, as shown in double-line arrows, for the meat food class 304, the camera 114 and the probe sensors 214 may be the most applicable of the sensors to include in the sensor inputs 312 to the recurrent model 302. In yet another example, for the frozen food class 304 as shown in dotted lines, the IR sensors 220, camera 114, and weight sensors 218 may be the most applicable of the sensors to include in the sensor inputs 312 to the recurrent model 302.

Thus, different types of foods may be grouped into different food groups to determine a set of sensor inputs for application to the recurrent model 302. Once the user selects the food, e.g. as noted above with respect to FIG. 3 by either accepting the food type recognized by a food classification model or selecting the food class themselves, the recurrent model 302 may use a sensor element lookup table 502 to determine which of the sensors should server as input into the recurrent model 302 for determining the current doneness score 314 to use in comparison with the target doneness level 310 for the desired doneness level 306.

Figure 6:
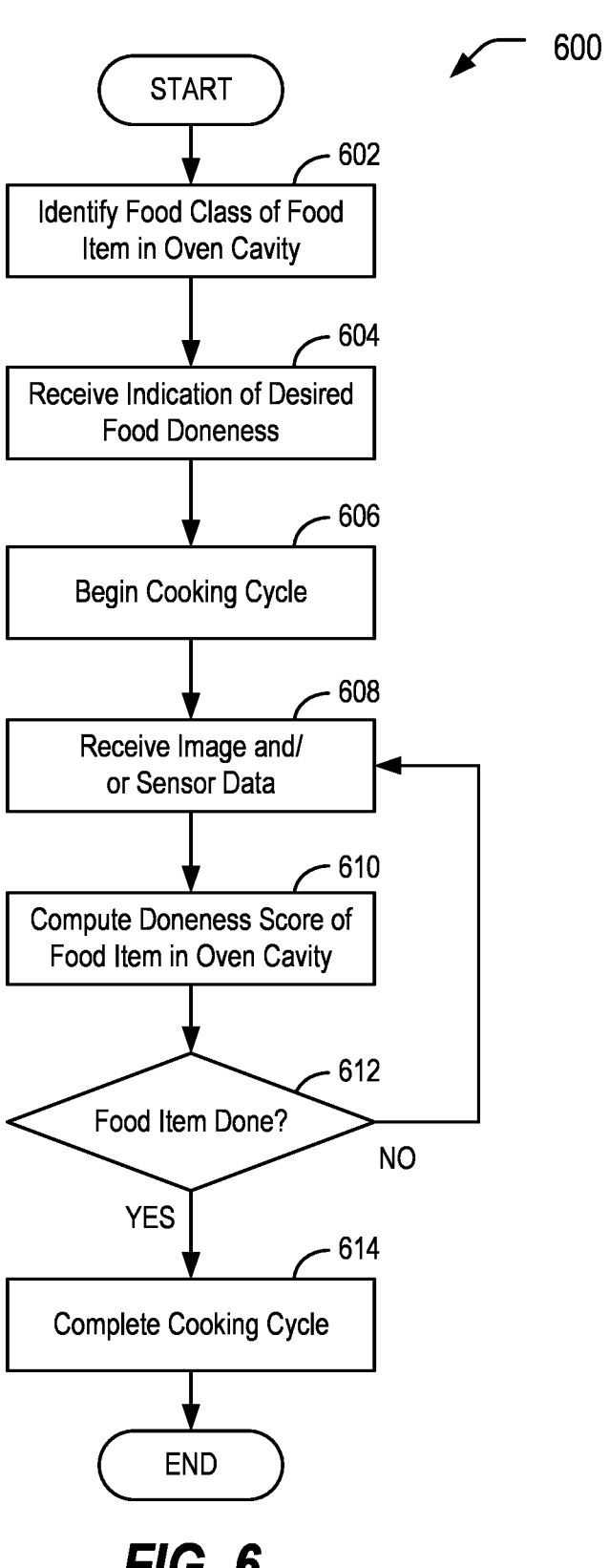
FIG. 6 illustrates an example process for controlling a heating process.

FIG. 6 illustrates an example process 600 for the use of the recurrent model 302 to control the operation of the smart oven 100. In an example, the process 600 may be performed by the doneness application 210 implementing the recurrent model 302 as executed by the processor 206 of the controller 200 of the smart oven 100. The process 600 may be initiated, for example, by a user placing a food item into the cavity 102 of the smart oven 100 and closing the door of the smart oven 100.

At operation 602, the smart oven 100 identifies the food class of the food item. In an example, the food type 304 may be automatically indicated by a recognition algorithm as discussed above. In another example, the food type 304 may be suggested by the recognition algorithm for confirmation by the user. In yet another example, the food type 304 may be indicated by user selection of a specific food class or type.

At operation 604, the smart oven 100 receives an indication of a desired doneness level 306 for the food item. In an example, the smart oven 100 may receive, from a user, a level of doneness from the user interface 118 of the smart oven 100. In some instances, the smart oven 100 may use the image classifier (or another food identification approach) to determine the class of food item to be cooked. In such an instance, the smart oven 100 may provide levels of doneness that correspond to the food item (e.g., rare, medium rare, medium, medium well, and well for a steak, levels of toastedness for a slice of bread, etc.). In another example, the smart oven 100 may maintain user preferences with respect to the desired level of doneness and may use those preferences as the desired doneness level.

At operation 606, the smart oven 100 begins a cooking cycle for the food item. For instance, the doneness application 210 may utilize the food class 304 and desired doneness level 306 as inputs to the lookup table 308 to retrieve begin cooking instructions 309 to use to control the heating system 122. The doneness application 210 may similarly retrieve the target doneness score 310 from the lookup table 308 corresponding to the inputs 304, 306.

At operation 608, the smart oven 100 receives image and/or sensor data. This sensor data may include, for example, spatial sensor data 402 and/or non-spatial sensor data 404 as discussed with respect to FIG. 4. In an example, the smart oven 100 receives an image from the camera 114 of the food item in the cavity 102 of the smart oven 100. The specific elements of sensor data to use may be retrieved by the doneness application 210 from a sensor element lookup table 502 according to the food class 304.

At operation 610, the smart oven 100 computes a done-ness score 314 for the food item. Aspects of the computation of the doneness score 314 computation are described above with respect to FIG. 4. At operation 612, the smart oven 100 determines whether the food item is done. In an example, the smart oven 100 compares the doneness score 314 deter-mined at operation 610 with the desired doneness level 306. If the doneness score 314 indicates that the food item has not yet reached the desired doneness level 306, control returns to operation 608. If the doneness score 314 indicates that the food item is at least at the desired doneness level 306, control passes to operation 616 to complete the cooking cycle.

At operation 614, the smart oven 100 completes the cooking cycle. In an example, the smart oven 100 may send the end cooking instructions 319 to the heating system 122. This may, for example, discontinue operation of the heating system 122. Or, this may set the heating system 122 to a warming mode to keep the food item ready for use. In another example, the smart oven 100 may display or sound an alert to indicate that preparation of the food item is complete. In yet a further example, as discussed with respect to FIG. 3, the smart oven 100 may solicit feedback from the user with respect to whether the food item was cooked to the desired doneness level 306. After operation 614 the process 600 ends.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodi-ments may be combined to form further embodiments of the disclosure.

The flowcharts and block diagrams in the figures illustrate the architecture, functionality, and operation of possible implementations of systems, methods and computer pro-gram products according to various embodiments of the present disclosure. In this regard, each block in the flowchart or block diagrams may represent a module, segment, or portion of code, which comprises one or more executable instructions for implementing the specified logical function (s). It should also be noted that, in some alternative imple-mentations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling a heating process, comprising:
recognizing, by a processor of a smart oven, a food class of a food item;
defining, by the processor, a target doneness score for the food item based on the food class and a desired doneness level;
capturing sensor data of the food item over time during a cooking cycle using one or more sensors of a smart oven, the sensor data including spatial sensor data and non-spatial data, the spatial sensor data including a sequence of images providing spatial and temporal information with respect to the food item, the non-spatial data specifying information over time without associated coordinates with respect to the food item;
applying, by the processor, the sensor data including the sequence of images as an input to a recurrent model trained to learn spatio-temporal relationships to deter-mine a current doneness score of the food item during the cooking cycle, wherein the recurrent model includes a plurality of recurrent units that utilize time-distributed layers to capture the spatio-temporal rela-tionships, wherein a first of the plurality of recurrent units is a convolutional recurrent unit configured to receive spatial inputs derived at least from the sequence of images, and a second of the recurrent units is a non-convolutional recurrent unit configured to receive non-spatial inputs derived from the non-spatial data, wherein outputs of the convolutional recurrent unit and the non-convolutional recurrent unit are combined by the recurrent model to determine the current doneness score; and
utilizing the current doneness score and the target done-ness score by the processor to control a heating system of the smart oven to cook the food item.

2. The method of claim 1, further comprising:
sending begin cooking instructions to the heating system to begin cooking the food item; and
sending end cooking instructions to the heating system responsive to the current doneness score reaching at least a minimum doneness likelihood threshold speci-fied by the target doneness score.

3. The method of claim 1, further comprising identifying the food class of the food item using an image classifier configured to receive the sensor data captured of the food item.

4. The method of claim 1, further comprising identifying the food class of the food item responsive to user input.

5. The method of claim 1, further comprising retrieving the target doneness score from a threshold lookup table according to the food class and the desired doneness level.

6. The method of claim 1, wherein the sequence of images includes a sequence of a plurality of camera images or infrared images, and the non-spatial data includes one or more of temperature sensor data over time, humidity sensor data over time, or weight sensor data over time.

7. The method of claim 1, further comprising:
providing input frames from a camera sensor imaging the food item to an image feature extractor; and
overlaying an auxiliary source of spatial sensor data over the output of the image feature extractor as an addi-tional channel of information for processing by the recurrent model.

8. The method of claim 1, further comprising utilizing a sensor element lookup table to identify, based on the food class, which elements of sensor data to apply as sensor inputs to the recurrent model.

9. A smart oven for controlling a heating process, com-prising:
one or more sensors;
a heating system; and
a processor, programmed to:
recognize a food class of a food item,
define a target doneness score for the food item based on the food class and a desired doneness level,
capture sensor data of the food item over time during a cooking cycle, the sensor data including spatial sensor data and non-spatial data, the spatial sensor data including a sequence of images providing spatial and temporal information with respect to the food item, the non-spatial data specifying information over time without associated coordinates with respect to the food item, applying the sensor data including the sequence of images as an input to a recurrent model trained to learn spatio-temporal relationships to determine a current doneness score of the food item during the cooking cycle, wherein the recurrent model includes a plurality of recurrent units that utilize time-distributed layers to capture the spatio-temporal relationships, wherein a first of the plurality of recurrent units is a convolutional recurrent unit configured to receive spatial inputs derived at least from the sequence of images, and a second of the recurrent units is a non-convolutional recurrent unit configured to receive non-spatial inputs derived from the non-spatial data, wherein outputs of the convolutional recurrent unit and the non-convolutional recurrent unit are combined by the recurrent model to determine the current doneness score, and utilize the current doneness score and the target doneness score to control the heating system to cook the food item.

10. The smart oven of claim 9, wherein the processor is further programmed to:

send begin cooking instructions to the heating system to begin cooking the food item; and send end cooking instructions to the heating system responsive to the current doneness score reaching at least a minimum doneness likelihood threshold specified by the target doneness score.

11. The smart oven of claim 9, wherein the processor is further programmed to identify the food class of the food item using an image classifier configured to receive the sensor data captured of the food item.

12. The smart oven of claim 9, wherein the processor is further programmed to identify the food class of the food item responsive to user input.

13. The smart oven of claim 9, wherein the processor is further programmed to retrieve the target doneness score from a threshold lookup table according to the food class and the desired doneness level.

14. The smart oven of claim 9, wherein the sequence of images includes a sequence of a plurality camera images or infrared images, and the non-spatial data includes one or more of temperature sensor data over time, humidity sensor data over time, or weight sensor data over time.

15. The smart oven of claim 9, wherein the processor is further programmed to:

provide input frames from a camera sensor imaging the food item to an image feature extractor; and overlay an auxiliary source of spatial sensor data over the output of the image feature extractor as an additional channel of information for processing by the recurrent model.

16. The smart oven of claim 9, wherein the processor is further programmed to utilize a sensor element lookup table to identify, based on the food class, which elements of sensor data to apply as sensor inputs to the recurrent model.

17. The smart oven of claim 9, wherein the outputs of the convolutional recurrent unit and the non-convolutional recurrent unit are combined using one or more hidden layers that output the current doneness score.

18. A non-transitory computer readable medium comprising instructions controlling a heating process of a smart oven having one or more sensors, a heating system, and a processor that, when executed by the processor of the smart oven, cause the smart oven to perform operations including to:

recognize a food class of a food item;

define a target doneness score for the food item based on the food class and a desired doneness level;

capture sensor data of the food item over time during a cooking cycle, the sensor data including spatial sensor data and non-spatial data, the spatial sensor data including a sequence of images providing spatial and temporal information with respect to the food item, the non-spatial data specifying information over time without associated coordinates with respect to the food item;

apply the sensor data including the sequence of images as an input to a recurrent model trained to learn spatio-temporal relationships to determine a current doneness score of the food item during the cooking cycle, wherein the recurrent model includes a plurality of recurrent units that utilize time-distributed layers to capture the spatio-temporal relationships, wherein a first of the plurality of recurrent units is a convolutional recurrent unit configured to receive spatial inputs derived at least from the sequence of images, and a second of the recurrent units is a non-convolutional recurrent unit configured to receive non-spatial inputs derived from the non-spatial data, wherein outputs of the convolutional recurrent unit and the non-convolutional recurrent unit are combined by the recurrent model to determine the current doneness score; and utilize the current doneness score and the target doneness score to control the heating system to cook the food item.

19. The medium of claim 18, further comprising instructions that, when executed by the processor, cause the smart oven to perform operations including to:

send begin cooking instructions to the heating system to begin cooking the food item; and send end cooking instructions to the heating system responsive to the current doneness score reaching at least a minimum doneness likelihood threshold specified by the target doneness score.

20. The medium of claim 18, further comprising instructions that, when executed by the processor, cause the smart oven to perform operations including to identify the food class of the food item using an image classifier configured to receive the sensor data captured of the food item.

21. The medium of claim 18, further comprising instructions that, when executed by the processor, cause the smart oven to perform operations including to identify the food class of the food item responsive to user input.

22. The medium of claim 18, further comprising instructions that, when executed by the processor, cause the smart oven to perform operations including to retrieve the target doneness score from a threshold lookup table according to the food class and the desired doneness level.

23. The medium of claim 18, wherein the sequence of images includes a sequence of a plurality camera images or infrared images, and the non-spatial data includes one or more of temperature sensor data over time, humidity sensor data over time, or weight sensor data over time.

24. The medium of claim 18, further comprising instructions that, when executed by the processor, cause the smart oven to perform operations including to:

provide input frames from a camera sensor imaging the food item to an image feature extractor; and

overlay an auxiliary source of spatial sensor data over the output of the image feature extractor as an additional channel of information for processing by the recurrent model.

25. The medium of claim 18, further comprising instructions that, when executed by the processor, cause the smart oven to perform operations including to utilize a sensor element lookup table to identify, based on the food class, which elements of sensor data to apply as sensor inputs to the recurrent model.

* * * * *